US009918280B1

(12) United States Patent
Hueber et al.

(10) Patent No.: US 9,918,280 B1
(45) Date of Patent: Mar. 13, 2018

(54) METHOD AND SYSTEM FOR AUTOMATIC POWER CONTROL (APC) IN A COMMUNICATIONS DEVICE THAT COMMUNICATES VIA INDUCTIVE COUPLING

(71) Applicant: NXP B.V., Eindhoven (NL)

(72) Inventors: Gernot Hueber, Linz (AT); Ian Thomas Macnamara, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/346,506

(22) Filed: Nov. 8, 2016

(51) Int. Cl.
*H04W 52/18* (2009.01)
*H04B 5/00* (2006.01)
*H04B 17/318* (2015.01)

(52) U.S. Cl.
CPC .......... *H04W 52/18* (2013.01); *H04B 5/0031* (2013.01); *H04B 17/318* (2015.01)

(58) Field of Classification Search
CPC ............................. H04W 52/04; H04W 52/143
See application file for complete search history.

(56) References Cited

U.S. PATENT DOCUMENTS

| 5,857,155 A * | 1/1999 | Hill ..................... G01S 19/52 |
| | | 342/357.29 |
| 2012/0122461 A1 | 5/2012 | Hossain et al. |
| 2013/0219697 A1* | 8/2013 | Ukai ...................... H05K 13/00 |
| | | 29/593 |
| 2015/0061404 A1 | 3/2015 | Lamenza et al. |
| 2015/0280444 A1 | 10/2015 | Smith et al. |
| 2016/0142109 A1 | 5/2016 | Kumar et al. |
| 2016/0294227 A1 | 10/2016 | Podkamien et al. |
| 2017/0110796 A1 | 4/2017 | Rokhsaz et al. |

* cited by examiner

*Primary Examiner* — Tuan H Nguyen

(57) ABSTRACT

Embodiments of methods and systems for automatic power control (APC) in a communications device that communicates via inductive coupling are described. In an embodiment, a method for APC in a communications device that communicates via inductive coupling involves storing a universal APC table for the communications device, adjusting the universal APC table in response to at least one system parameter, and controlling a transmission configuration of the communications device based on the adjusted APC table. Other embodiments are also described.

19 Claims, 7 Drawing Sheets

| RSSI (CODE) | Tx SETTING ID | | ID | TxLDO (V) | BACK-OFF (mV) | MODULATION INDEX CONFIG | NumDrivers | Other Tx Mod |
|---|---|---|---|---|---|---|---|---|
| | | | 0 | TVDD1 | BACKOFF1 | MODINDEX1 | 2 | MOD1 |
| | | | 1 | TVDD1 | BACKOFF1 | MODINDEX2 | 2 | MOD1 |
| | | | 2 | TVDD1 | BACKOFF1 | MODINDEX3 | 2 | MOD1 |
| | | | 3 | TVDD1 | BACKOFF1 | MODINDEX4 | 2 | MOD1 |
| | | | 4 | TVDD2 | BACKOFF1 | MODINDEX1 | 2 | MOD2 |
| | | | 5 | TVDD2 | BACKOFF1 | MODINDEX2 | 2 | MOD2 |
| | | | 6 | TVDD2 | BACKOFF1 | MODINDEX3 | 2 | MOD2 |
| | | | 7 | TVDD2 | BACKOFF1 | MODINDEX3 | 2 | MOD2 |
| RSSI1 | Tx SETTING_ID1 | → | 8 | TVDD2 | BACKOFF1 | MODINDEX4 | 2 | MOD2 |
| RSSI2 | Tx SETTING_ID2 | → | 9 | TVDD2 | BACKOFF1 | MODINDEX5 | 2 | MOD2 |
| RSSI3 | Tx SETTING_ID3 | → | 10 | TVDD2 | BACKOFF1 | MODINDEX6 | 2 | MOD2 |
| RSSI4 | Tx SETTING_ID4 | | 11 | TVDD3 | BACKOFF1 | MODINDEX1 | 2 | MOD2 |
| RSSI5 | Tx SETTING_ID5 | | 12 | TVDD3 | BACKOFF1 | MODINDEX2 | 2 | MOD2 |
| RSSI6 | Tx SETTING_ID6 | | 13 | TVDD3 | BACKOFF1 | MODINDEX3 | 2 | MOD2 |
| RSSI7 | Tx SETTING_ID7 | | 14 | TVDD3 | BACKOFF1 | MODINDEX3 | 2 | MOD2 |
| RSSI8 | Tx SETTING_ID8 | | 15 | TVDD3 | BACKOFF1 | MODINDEX4 | 2 | MOD2 |
| RSSI9 | Tx SETTING_ID9 | | 16 | TVDD3 | BACKOFF1 | MODINDEX5 | 2 | MOD2 |
| RSSI10 | Tx SETTING_ID10 | | 17 | TVDD3 | BACKOFF1 | MODINDEX6 | 2 | MOD2 |
| RSSI11 | Tx SETTING_ID11 | | 18 | TVDD4 | BACKOFF1 | MODINDEX1 | 2 | MOD2 |
| RSSI12 | Tx SETTING_ID12 | | 19 | TVDD4 | BACKOFF1 | MODINDEX2 | 2 | MOD2 |
| RSSI13 | Tx SETTING_ID13 | | 20 | TVDD4 | BACKOFF1 | MODINDEX3 | 2 | MOD2 |
| RSSI14 | Tx SETTING_ID14 | | 21 | TVDD4 | BACKOFF1 | MODINDEX3 | 1 | MOD2 |
| RSSI15 | Tx SETTING_ID15 | | 22 | TVDD4 | BACKOFF1 | MODINDEX4 | 1 | MOD2 |
| RSSI16 | Tx SETTING_ID16 | | 23 | TVDD4 | BACKOFF1 | MODINDEX5 | 1 | MOD2 |
| RSSI17 | Tx SETTING_ID17 | | 24 | TVDD5 | BACKOFF2 | MODINDEX1 | 1 | MOD1 |
| RSSI18 | Tx SETTING_ID18 | | 25 | TVDD5 | BACKOFF2 | MODINDEX2 | 1 | MOD1 |
| RSSI19 | Tx SETTING_ID19 | | 26 | TVDD5 | BACKOFF2 | MODINDEX3 | 1 | MOD2 |
| RSSI20 | Tx SETTING_ID20 | → | 27 | TVDD5 | BACKOFF2 | MODINDEX4 | 1 | MOD2 |
| | | | 28 | TVDD6 | BACKOFF3 | MODINDEX1 | 1 | MOD1 |
| | | | 29 | TVDD6 | BACKOFF3 | MODINDEX2 | 1 | MOD1 |
| | | | 30 | TVDD6 | BACKOFF3 | MODINDEX3 | 1 | MOD2 |
| | | | 31 | TVDD6 | BACKOFF3 | MODINDEX4 | 1 | MOD2 |

FIG. 3

| RSSI (CODE) | Tx SETTING ID |  | ID | TxLDO (V) | BACK-OFF (mV) | MODULATION INDEX CONFIG | NumDrivers | Other Tx Mod |
|---|---|---|---|---|---|---|---|---|
|  |  |  | 0 | TVDD1 | BACKOFF1 | MODINDEX1 | 2 | MOD1 |
|  |  |  | 1 | TVDD1 | BACKOFF1 | MODINDEX2 | 2 | MOD1 |
|  |  |  | 2 | TVDD1 | BACKOFF1 | MODINDEX3 | 2 | MOD1 |
|  |  |  | 3 | TVDD1 | BACKOFF1 | MODINDEX4 | 2 | MOD1 |
|  |  |  | 4 | TVDD2 | BACKOFF1 | MODINDEX1 | 2 | MOD2 |
|  |  |  | 5 | TVDD2 | BACKOFF1 | MODINDEX2 | 2 | MOD2 |
|  |  |  | 6 | TVDD2 | BACKOFF1 | MODINDEX3 | 2 | MOD2 |
|  |  |  | 7 | TVDD2 | BACKOFF1 | MODINDEX3 | 2 | MOD2 |
|  |  |  | 8 | TVDD2 | BACKOFF1 | MODINDEX4 | 2 | MOD2 |
|  |  |  | 9 | TVDD2 | BACKOFF1 | MODINDEX5 | 2 | MOD2 |
| RSSI (CODE) | Tx SETTING ID |  | 10 | TVDD2 | BACKOFF1 | MODINDEX6 | 2 | MOD2 |
| RSSI1 | Tx SETTING_ID1 | → | 11 | TVDD3 | BACKOFF1 | MODINDEX1 | 2 | MOD2 |
| RSSI2 | Tx SETTING_ID2 | → | 12 | TVDD3 | BACKOFF1 | MODINDEX2 | 2 | MOD2 |
| RSSI3 | Tx SETTING_ID3 | → | 13 | TVDD3 | BACKOFF1 | MODINDEX3 | 2 | MOD2 |
| RSSI4 | Tx SETTING_ID4 |  | 14 | TVDD3 | BACKOFF1 | MODINDEX3 | 2 | MOD2 |
| RSSI5 | Tx SETTING_ID5 |  | 15 | TVDD3 | BACKOFF1 | MODINDEX4 | 2 | MOD2 |
| RSSI6 | Tx SETTING_ID6 |  | 16 | TVDD3 | BACKOFF1 | MODINDEX5 | 2 | MOD2 |
| RSSI7 | Tx SETTING_ID7 |  | 17 | TVDD3 | BACKOFF1 | MODINDEX6 | 2 | MOD2 |
| RSSI8 | Tx SETTING_ID8 |  | 18 | TVDD4 | BACKOFF1 | MODINDEX1 | 2 | MOD2 |
| RSSI9 | Tx SETTING_ID9 |  | 19 | TVDD4 | BACKOFF1 | MODINDEX2 | 2 | MOD2 |
| RSSI10 | Tx SETTING_ID10 |  | 20 | TVDD4 | BACKOFF1 | MODINDEX3 | 2 | MOD2 |
| RSSI11 | Tx SETTING_ID11 |  | 21 | TVDD4 | BACKOFF1 | MODINDEX3 | 1 | MOD2 |
| RSSI12 | Tx SETTING_ID12 |  | 22 | TVDD4 | BACKOFF1 | MODINDEX4 | 1 | MOD2 |
| RSSI13 | Tx SETTING_ID13 |  | 23 | TVDD4 | BACKOFF1 | MODINDEX5 | 1 | MOD2 |
| RSSI14 | Tx SETTING_ID14 |  | 24 | TVDD5 | BACKOFF2 | MODINDEX1 | 1 | MOD1 |
| RSSI15 | Tx SETTING_ID15 |  | 25 | TVDD5 | BACKOFF2 | MODINDEX2 | 1 | MOD1 |
| RSSI16 | Tx SETTING_ID16 |  | 26 | TVDD5 | BACKOFF2 | MODINDEX3 | 1 | MOD2 |
| RSSI17 | Tx SETTING_ID17 |  | 27 | TVDD5 | BACKOFF2 | MODINDEX4 | 1 | MOD2 |
| RSSI18 | Tx SETTING_ID18 |  | 28 | TVDD6 | BACKOFF3 | MODINDEX1 | 1 | MOD1 |
| RSSI19 | Tx SETTING_ID19 |  | 29 | TVDD6 | BACKOFF3 | MODINDEX2 | 1 | MOD1 |
| RSSI20 | Tx SETTING_ID20 | → | 30 | TVDD6 | BACKOFF3 | MODINDEX3 | 1 | MOD2 |
|  |  |  | 31 | TVDD6 | BACKOFF3 | MODINDEX4 | 1 | MOD2 |

FIG. 4

| | | | ID | TxLDO (V) | BACK-OFF (mV) | MODULATION INDEX CONFIG | NumDrivers | Other Tx Mod |
|---|---|---|---|---|---|---|---|---|
| | | | 0 | TVDD1 | BACKOFF1 | MODINDEX1 | 2 | MOD1 |
| | | | 1 | TVDD1 | BACKOFF1 | MODINDEX2 | 2 | MOD1 |
| RSSI (CODE) | Tx SETTING ID | | 2 | TVDD1 | BACKOFF1 | MODINDEX3 | 2 | MOD1 |
| RSSI1 | Tx SETTING_ID1 | →  | 3 | TVDD1 | BACKOFF1 | MODINDEX4 | 2 | MOD1 |
| RSSI2 | Tx SETTING_ID2 | →  | 4 | TVDD2 | BACKOFF1 | MODINDEX1 | 2 | MOD2 |
| RSSI3 | Tx SETTING_ID3 | →  | 5 | TVDD2 | BACKOFF1 | MODINDEX2 | 2 | MOD2 |
| RSSI4 | Tx SETTING_ID4 | | 6 | TVDD2 | BACKOFF1 | MODINDEX3 | 2 | MOD2 |
| RSSI5 | Tx SETTING_ID5 | | 7 | TVDD2 | BACKOFF1 | MODINDEX3 | 2 | MOD2 |
| RSSI6 | Tx SETTING_ID6 | | 8 | TVDD2 | BACKOFF1 | MODINDEX4 | 2 | MOD2 |
| RSSI7 | Tx SETTING_ID7 | | 9 | TVDD2 | BACKOFF1 | MODINDEX5 | 2 | MOD2 |
| RSSI8 | Tx SETTING_ID8 | | 10 | TVDD2 | BACKOFF1 | MODINDEX6 | 2 | MOD2 |
| RSSI9 | Tx SETTING_ID9 | | 11 | TVDD3 | BACKOFF1 | MODINDEX1 | 2 | MOD2 |
| RSSI10 | Tx SETTING_ID10 | | 12 | TVDD3 | BACKOFF1 | MODINDEX2 | 2 | MOD2 |
| RSSI11 | Tx SETTING_ID11 | | 13 | TVDD3 | BACKOFF1 | MODINDEX3 | 2 | MOD2 |
| RSSI12 | Tx SETTING_ID12 | | 14 | TVDD3 | BACKOFF1 | MODINDEX3 | 2 | MOD2 |
| RSSI13 | Tx SETTING_ID13 | | 15 | TVDD3 | BACKOFF1 | MODINDEX4 | 2 | MOD2 |
| RSSI14 | Tx SETTING_ID14 | | 16 | TVDD3 | BACKOFF1 | MODINDEX5 | 2 | MOD2 |
| RSSI15 | Tx SETTING_ID15 | | 17 | TVDD3 | BACKOFF1 | MODINDEX6 | 2 | MOD2 |
| RSSI16 | Tx SETTING_ID16 | | 18 | TVDD4 | BACKOFF1 | MODINDEX1 | 2 | MOD2 |
| RSSI17 | Tx SETTING_ID17 | | 19 | TVDD4 | BACKOFF1 | MODINDEX2 | 2 | MOD2 |
| RSSI18 | Tx SETTING_ID18 | | 20 | TVDD4 | BACKOFF1 | MODINDEX3 | 2 | MOD2 |
| RSSI19 | Tx SETTING_ID19 | | 21 | TVDD4 | BACKOFF1 | MODINDEX3 | 1 | MOD2 |
| RSSI20 | Tx SETTING_ID20 | →  | 22 | TVDD4 | BACKOFF1 | MODINDEX4 | 1 | MOD2 |
| | | | 23 | TVDD4 | BACKOFF1 | MODINDEX5 | 1 | MOD2 |
| | | | 24 | TVDD5 | BACKOFF2 | MODINDEX1 | 1 | MOD1 |
| | | | 25 | TVDD5 | BACKOFF2 | MODINDEX2 | 1 | MOD1 |
| | | | 26 | TVDD5 | BACKOFF2 | MODINDEX3 | 1 | MOD2 |
| | | | 27 | TVDD5 | BACKOFF2 | MODINDEX4 | 1 | MOD2 |
| | | | 28 | TVDD6 | BACKOFF3 | MODINDEX1 | 1 | MOD1 |
| | | | 29 | TVDD6 | BACKOFF3 | MODINDEX2 | 1 | MOD1 |
| | | | 30 | TVDD6 | BACKOFF3 | MODINDEX3 | 1 | MOD2 |
| | | | 31 | TVDD6 | BACKOFF3 | MODINDEX4 | 1 | MOD2 |

FIG. 5

METHOD AND SYSTEM FOR AUTOMATIC POWER CONTROL (APC) IN A COMMUNICATIONS DEVICE THAT COMMUNICATES VIA INDUCTIVE COUPLING

BACKGROUND

Communications devices can communicate with each other via inductive coupling. For example, near field communications (NFC) is a wireless technology based on radio frequency identification (RFID). NFC allows wireless connection between two devices in close proximity to each other to exchange data between the two devices. RFID transponder devices that utilize NFC typically can be configured for either passive load modulation (PLM) or active load modulation (ALM).

In a communications device that communicates via inductive coupling, automatic power control (APC) is used to control the load modulation amplitude (LMA) in response to the field-strength of inductive coupling to fulfill specification requirements. However, in a typical table-based APC approach, a static APC table is defined and tuned for a communications device, which requires multiple iterations of measurements and manual calculations. In addition, when the specific system configuration of a communications device changes, a new APC table needs to be generated from scratch, which can increase the computing and measurement overhead.

SUMMARY

Embodiments of methods and systems for APC in a communications device that communicates via inductive coupling are described. In an embodiment, a method for APC in a communications device that communicates via inductive coupling involves storing a universal APC table for the communications device, adjusting the universal APC table in response to at least one system parameter, and controlling a transmission configuration of the communications device based on the adjusted APC table. Other embodiments are also described.

In an embodiment, the universal APC table contains information reflecting a relationship between a field strength of inductive coupling and a load modulation amplitude of the communications device.

In an embodiment, the universal APC table contains information regarding a received signal strength indicator (RSSI) at the communications device and information regarding corresponding transmission configuration of the communications device.

In an embodiment, the information regarding the transmission configuration of the communications device comprises index information of predefined transmission configurations of the communications device.

In an embodiment, the transmission configuration of the communications device comprises at least one of information regarding a transmitter driver supply voltage of the communications device, information regarding modulation configuration of the communications device, information regarding a number of transmitter drivers in the communications device, and information regarding a ratio between a maximum possible transmit power and an actual mean transmit power of the communications device.

In an embodiment, adjusting the universal APC table in response to the at least one system parameter involves scaling a parameter in the universal APC table in response to the at least one system parameter.

In an embodiment, adjusting the universal APC table in response to the at least one system parameter involves shifting entries in the universal APC table in response to the at least one system parameter.

In an embodiment, the at least one system parameter is selected from the group consisting of a ratio between an RSSI at the communications device and a field strength of inductive coupling, and a ratio between a load modulation amplitude of the communications device and a transmitter output signal amplitude of the communications device.

In an embodiment, adjusting the universal APC table in response to the at least one system parameter involves scaling an RSSI parameter in the universal APC table in response to the ratio between the RSSI at the communications device and the field strength of inductive coupling.

In an embodiment, adjusting the universal APC table in response to the at least one system parameter involves scaling up the RSSI parameter in the universal APC table in response to an increase in the ratio between the RSSI at the communications device and the field strength of inductive coupling.

In an embodiment, adjusting the universal APC table in response to the at least one system parameter involves scaling down the RSSI parameter in the universal APC table in response to a decrease in the ratio between the RSSI at the communications device and the field strength of inductive coupling.

In an embodiment, adjusting the universal APC table in response to the at least one system parameter involves shifting entries in the universal APC table in response to the ratio between the load modulation amplitude of the communications device and the transmitter output signal amplitude of the communications device.

In an embodiment, an APC unit for a communications device that communicates via inductive coupling includes an APC table storage unit that stores a universal APC table for the communications device, an APC adjustor unit configured to adjust the universal APC table in response to at least one system parameter, and a transmission configuration control unit configured to control a transmission configuration of the communications device based on the adjusted APC table.

In an embodiment, the universal APC table contains information reflecting a relationship between a field strength of inductive coupling and a load modulation amplitude of the communications device.

In an embodiment, the universal APC table contains information regarding a RSSI at the communications device and information regarding corresponding transmission configuration of the communications device.

In an embodiment, the transmission configuration of the communications device comprises at least one of information regarding a transmitter driver supply voltage of the communications device, information regarding modulation configuration of the communications device, information regarding a number of transmitter drivers in the communications device, and information regarding a ratio between a maximum possible transmit power and an actual mean transmit power of the communications device.

In an embodiment, the at least one system parameter is selected from the group consisting of a ratio between an RSSI at the communications device and a field strength of inductive coupling and a ratio between a load modulation amplitude of the communications device and a transmitter output signal amplitude of the communications device.

In an embodiment, the APC adjustor unit is configured to scale up the RSSI parameter in the universal APC table in response to an increase in the ratio between the RSSI at the communications device and the field strength of inductive coupling and scale down the RSSI parameter in the universal APC table in response to a decrease in the ratio between the RSSI at the communications device and the field strength of inductive coupling.

In an embodiment, the APC adjustor unit is configured to shift entries in the universal APC table in response to the ratio between the load modulation amplitude of the communications device and the transmitter output signal amplitude of the communications device.

In an embodiment, a method for APC in a communications device that communicates via inductive coupling involves storing a universal APC table for the communications device, where the universal APC table contains information regarding an RSSI at the communications device and index information of a plurality of predefined transmission configurations of the communications device, adjusting the universal APC table in response to a ratio between the RSSI at the communications device and a field strength of inductive coupling or a ratio between a load modulation amplitude of the communications device and a transmitter output signal amplitude of the communications device, and controlling a transmission configuration of the communications device based on the adjusted APC table.

Other aspects and advantages of embodiments of the present invention will become apparent from the following detailed description taken in conjunction with the accompanying drawings.

BRIEF DESCRIPTION OF THE DRAWINGS

FIG. 3 illustrates an extended APC table for the communications device depicted in FIG. 2 corresponding to a reference TX-Gain.

FIG. 4 illustrates an extended APC table for the communications device depicted in FIG. 2 corresponding to a TX-Gain that is higher than the reference TX-Gain.

FIG. 5 illustrates an extended APC table for the communications device depicted in FIG. 2 corresponding to a TX-Gain that is lower than the reference TX-Gain.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
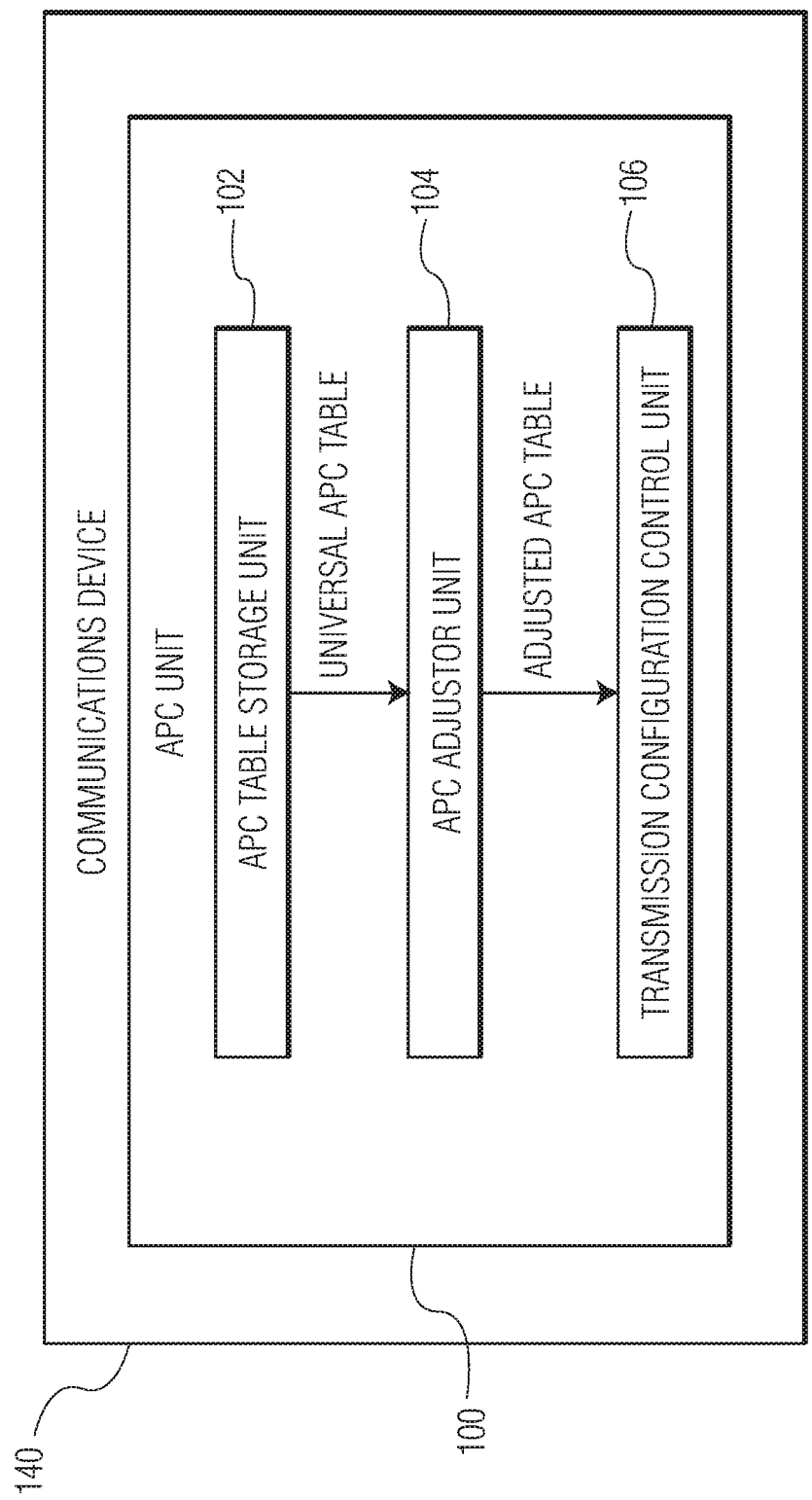
FIG. 1 is a functional block diagram of a communications device in accordance with an embodiment of the invention.

FIG. 1 is a functional block diagram of a communications device 140 in accordance with an embodiment of the invention. In the embodiment depicted in FIG. 1, the communications device communicates via inductive coupling. The communications device may include an automatic power control (APC) unit 100 configured to perform automatic power control for the communications device. For example, the APC unit can be used to control the load modulation amplitude (LMA) in response to the field-strength of inductive coupling to fulfill specification requirements (e.g., EVMCo, NFC Forum, or the International Organization for Standardization (ISO)/the International Electrotechnical Commission (IEC) 14443 requirements). The communications device may be an integrated circuit (IC) device. In some embodiments, the communications device is implemented in a handheld computing system or a mobile computing system, such as a mobile phone. The communications device may be a near field communications (NFC) device that utilizes inductive coupling to communicate. In some embodiments, the communications device is implemented as an RF transponder compatible with the ISO/IEC 14443 standard. Although the illustrated communications device is shown with certain components and described with certain functionality herein, other embodiments of the communications device may include fewer or more components to implement the same, less, or more functionality. In some embodiments, the communications device is an active load modulation (ALM) device. In such embodiments, the communications device can be configured to generate its own magnetic field for transmitting an outgoing RF signal using a current source, which results in greater communications distances compared to passive load modulation (PLM) systems.

In the embodiment depicted in FIG. 1, the APC unit 100 can adapt the load modulation amplitude (LMA) in response to one or more system parameters of the communications device. Consequently, the overall inductive coupling based communications performance of the communications device can be improved. In addition, compared to a typical table-based APC approach in which a specific APC table is stored on-chip for a particular system configuration, the APC unit stores a universal APC table on-chip and adjusts the universal APC table in response to one or more system parameters of the communications device. For example, the universal APC table may be scaled, shifted or transformed in response to one or more system parameters of the communications device. Consequently, the APC unit does not need to store a large amount of data on-chip. As a result, storage space (e.g., memory space), which is limited in the communications device, can be saved. In the embodiment depicted in FIG. 1, the APC unit includes an APC table storage unit 102, an APC adjustor unit 104, and a transmission configuration control unit 106. Although the illustrated APC table storage unit is shown as being separate from the APC adjustor unit and the transmission configuration control unit, in some embodiments, the APC table storage unit or some portion thereof is implemented within the APC adjustor unit and the transmission configuration control unit.

The APC table storage unit 102 of the APC unit 100 is used to store a universal APC table for the communications device. The APC table storage unit may be implemented at least in part as on-board memory, such as read only memory (ROM), flash memory, random access memory (RAM), or cache of the communications devices. The universal APC table can be used for multiple platforms/configurations. The universal APC table may contain information reflecting a relationship between the field strength of inductive coupling and an LMA of the communications device. In some embodiments, the universal APC table contains information regarding a received signal strength indicator (RSSI) at the communications device and information regarding a corresponding transmission configuration of the communications device. The information regarding the transmission configuration of the communications device may include index information (e.g., an index number) of multiple predefined transmission configurations of the communications device. The transmission configuration of the communications device may include a transmitter driver supply voltage of the communications device, modulation configuration of the communications device, the number of transmitter drivers in the communications device, and/or the ratio between a maximum possible transmit power and an actual mean transmit power of the communications device.

The APC adjustor unit 104 of the APC unit 100 is configured to adjust the universal APC table in response to at least one system parameter. The APC adjustor unit may be implemented at least in part as a processor or a microcontroller. Different communications devices (e.g., communications devices of different manufacturers, communications devices of different models, communications devices of different types) may have different antennas (e.g., with different sizes and/or different gains), different matching networks (e.g., different matching network topologies or different matching network implementations), which can impact the channel condition between the communications device 140 and a corresponding reader device. Adjusting the universal APC table based on one or more system parameters to achieve a good signal to noise ratio (SNR) can provide robust communications across different communications devices. In some embodiments, the APC adjustor unit scales a parameter in the universal APC table in response to the at least one system parameter. In some embodiments, the APC adjustor unit shifts entries in the universal APC table in response to the at least one system parameter. Other adjustments to the universal APC table are also possible. In some embodiments, the APC table for the communications device is implemented as an APC function. For example, the APC adjustor unit may use an APC function unit that stores APC information as, for example, a function of field strength and LMA or transmission configurations.

Examples of system parameters used by the APC adjustor unit 104 may include, without being limited to, a field strength of inductive coupling, a coupling condition of inductive coupling, a receiving characteristic of the communications device 140, and a transmission characteristic of the communications device. In some embodiments, the at least one system parameter used by the APC adjustor unit includes an RX-Gain parameter and/or a TX-Gain parameter. In an embodiment, the RX-Gain parameter is a ratio between a received signal strength indicator (RSSI) at the communications device and a field strength of inductive coupling. In an embodiment, the TX-Gain parameter is a ratio between a load modulation amplitude of the communications device and a transmitter output signal amplitude of the communications device. The system or environmental parameter may include a combination of two or more system parameters as listed above. In some embodiments, the APC adjustor unit is configured to adjust the universal APC table according to a function of a group of system parameters. In some embodiments, the APC adjustor unit 104 scales a RSSI parameter in the universal APC table in response to the RX-gain parameter. The APC adjustor may scale up the RSSI parameter in the universal APC table in response to an increase in the RX-gain parameter and/or scale down the RSSI parameter in the universal APC table in response to a decrease in the RX-gain parameter. In some embodiments, the APC adjustor unit shifts entries in the universal APC table in response to TX-Gain parameter.

The transmission configuration control unit 106 of the APC unit 100 is configured to control a transmission configuration of the communications device 140 based on the adjusted APC table. The transmission configuration control unit may be implemented at least in part as a processor or a microcontroller. The transmission configuration of the communications device may include at least one of information regarding a transmitter driver supply voltage of the communications device, information regarding modulation configuration of the communications device, information regarding a number of transmitter drivers in the communications device, and information regarding a ratio between a maximum possible transmit power and an actual mean transmit power of the communications device.

Figure 2:
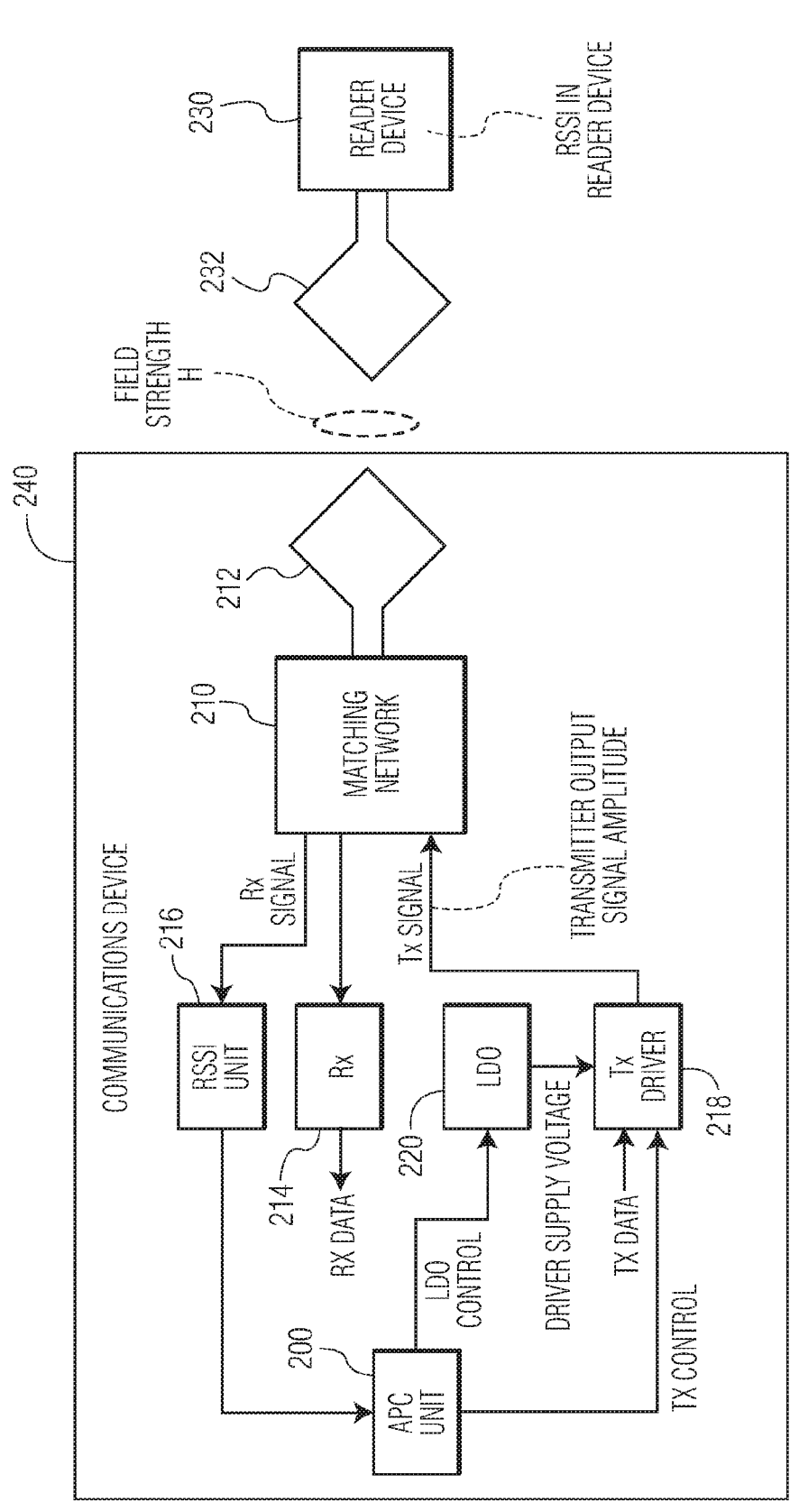
FIG. 2 depicts an embodiment of the communications device depicted in FIG. 1 that can be used with a corresponding reader to form an inductively coupled communications system.

FIG. 2 depicts an embodiment of the communications device 140 depicted in FIG. 1 that can be used with a corresponding reader device 230 to form an inductively coupled communications system 250. The corresponding reader device may be a dedicated reader device or a communications device in reader-mode. In the embodiment depicted in FIG. 2, a communications device 240 includes an APC unit 200, a matching network 210 that is coupled to an antenna 212, an analog receiver "RX" 214, a RSSI unit 216 configured to measure the signal amplitude of the received RF signal (RX signal) to generate a received signal strength indicator (RSSI) value, an analog transmitter "TX" driver 218, and a low-dropout regulator (LDO) 220. The antenna may be an induction type antenna such as a loop antenna. In an example operation of the communications device, an RF signal is received by the antenna via inductive coupling from an antenna 232 of the corresponding reader device and is passed to the analog receiver to convert the RF signal into a digital signal. A signal is generated from the RF signal and is used to produce an outgoing RF signal at the analog transmitter, which is transmitted via inductive coupling using the antenna. The communications device 240 depicted in FIG. 2 is one possible embodiment of the communications device 140 depicted in FIG. 1. However, the communications device depicted in FIG. 1 is not limited to the embodiment shown in FIG. 2. In some embodiments, the RSSI unit is a component of the APC unit 200. In some embodiments, the communications device 240 includes a clock generation circuit that is used to generate a clock that is synchronous to the received clock and thus synchronous to the carrier sent out by the reader device. In some embodiments, the communications device 240 is an active load modulation (ALM) device. In these embodiments, the antenna can be configured to generate its own magnetic field for transmitting the outgoing RF signal using a current source, which can result in greater communications distances than PLM devices.

In the embodiment depicted in FIG. 2, the APC unit 200 stores a universal APC table for the communications device 240, adjusts the universal APC table in response to at least one system parameter, and controls a transmission configuration of the communications device based on the adjusted APC table. In some embodiments, the APC unit controls a transmission configuration of the communications device based on the adjusted APC table by generating a TX control signal to control the TX driver 218. For example, the APC unit can control a modulation configuration (e.g., select a specific modulation scheme from a number of potential modulation schemes) in the TX driver. In another example, the APC unit can control the TX driver to achieve or exceed a particular ratio between a maximum possible transmit power and an actual mean transmit power of the communications device. In another example, the APC unit can adjust the number of transmitter drivers in the communications device (e.g., by enabling or disabling one or more TX drivers). In addition, the APC unit may also control the LDO 220 to set a driver supply voltage for the TX driver based on the adjusted APC table.

In some embodiments, the APC unit 200 of the communications device 240 stores a universal APC table for the communications device 240 that contains information reflecting a relationship between the field strength, H, of inductive coupling and the load modulation amplitude (LMA) of the communications device. Table 1 provides an example of the field strength, H, of inductive coupling (e.g., in amperes per meter (A/m)) and corresponding LMA (e.g., in mVpp) of the communications device. In Table 1, field strengths, H0-H23, correspond to load modulation amplitudes, LMA1-LMA24, respectively.

TABLE 1

| Field strength (A/m) | Target ISO LMA (mVpp) |
| --- | --- |
| H0 | LMA1 |
| H1 | LMA2 |
| H2 | LMA3 |
| H3 | LMA4 |
| H4 | LMA5 |
| H5 | LMA6 |
| H6 | LMA7 |
| H7 | LMA8 |
| H8 | LMA9 |
| H9 | LMA10 |
| H10 | LMA11 |
| H11 | LMA12 |
| H12 | LMA13 |
| H13 | LMA14 |
| H14 | LMA15 |
| H15 | LMA16 |
| H16 | LMA17 |
| H17 | LMA18 |
| H18 | LMA19 |
| H19 | LMA20 |
| H20 | LMA21 |
| H21 | LMA22 |
| H22 | LMA23 |
| H23 | LMA24 |

In some embodiments, a target field strength may be mapped to a RSSI value. In some embodiments, LMAs from Table 1 by be equidistant with a relative step size X such that, for example:

$$X1 = \frac{LMA_{i+1}}{LMA_i} - 1, \quad (1)$$

for all indices i from Table 1. In these embodiments, the LMA decreases or increases with every step by an equal step size. In some embodiments, LMAs from Table 1 use a granularity of relative step size X such that, for example:

$$X2 = \frac{LMA_j}{LMA_i} - 1, \quad (2)$$

for all indices i, j from Table 1.

In some embodiments, the relationship between the field strength, H, of inductive coupling and the LMA of the communications device 240 is represented by a look up table of RSSI codes and corresponding index information of transmission configurations of the communications device (TX setting ID). Specially, the field strength, H, of inductive coupling is represented by a RSSI code and the LMA of the communications device is represented by a TX setting ID. Table 2 provides an example of a universal APC table for the communications device depicted in FIG. 2 containing RSSI codes and corresponding TX setting IDs. In Table 2, RSSI codes RSSI1-RSSI24, which represent the field strengths, correspond to TX setting IDs TX_Setting_ID1-TX_Setting_ID24, respectively.

TABLE 2

| RSSI Code | TX Setting ID |
| --- | --- |
| RSSI1 | TX_Setting_ID1 |
| RSSI2 | TX_Setting_ID2 |

TABLE 2-continued

| RSSI Code | TX Setting ID |
|---|---|
| RSSI3 | TX_Setting_ID3 |
| RSSI4 | TX_Setting_ID4 |
| RSSI5 | TX_Setting_ID5 |
| RSSI6 | TX_Setting_ID6 |
| RSSI7 | TX_Setting_ID7 |
| RSSI8 | TX_Setting_ID8 |
| RSSI9 | TX_Setting_ID9 |
| RSSI10 | TX_Setting_ID10 |
| RSSI11 | TX_Setting_ID11 |
| RSSI12 | TX_Setting_ID12 |
| RSSI13 | TX_Setting_ID13 |
| RSSI14 | TX_Setting_ID14 |
| RSSI15 | TX_Setting_ID15 |
| RSSI16 | TX_Setting_ID16 |
| RSSI17 | TX_Setting_ID17 |
| RSSI18 | TX_Setting_ID18 |
| RSSI19 | TX_Setting_ID19 |
| RSSI20 | TX_Setting_ID20 |
| RSSI21 | TX_Setting_ID21 |
| RSSI22 | TX_Setting_ID22 |
| RSSI23 | TX_Setting_ID23 |
| RSSI24 | TX_Setting_ID24 |

Table 3 provides an example of a universal APC table for the communications device 240 depicted in FIG. 2 containing RSSI code values and corresponding TX setting ID values. In Table 3, RSSI code values 0-1150, which represent the field strengths, correspond to TX setting ID values 5-28, respectively.

TABLE 3

| RSSI Code | TX Setting ID |
|---|---|
| 0 | 5 |
| 50 | 6 |
| 100 | 7 |
| 150 | 8 |
| 200 | 9 |
| 250 | 10 |
| 300 | 11 |
| 350 | 12 |
| 400 | 13 |
| 450 | 14 |
| 500 | 15 |
| 550 | 16 |
| 600 | 17 |
| 650 | 18 |
| 700 | 19 |
| 750 | 20 |
| 800 | 21 |
| 850 | 22 |
| 900 | 23 |
| 950 | 24 |
| 1000 | 25 |
| 1050 | 26 |
| 1100 | 27 |
| 1150 | 28 |

In some embodiments, a universal APC table for the communications device 240 depicted in FIG. 2 includes only one index value of transmission configuration of the communications device (TX setting ID). Other index values can be derived from the sole index value, which reduces the on-chip memory space used for storing the universal APC table. Table 4 provides an example of a universal APC table containing RSSI codes and one TX setting ID. In Table 4, RSSI code RSSI1 corresponds to TX_Setting_ID1. Based on the relationship between RSSI1 and TX_Setting_ID1, it can be derived that RSSI2 corresponds to TX_Setting_ID1+1, RSSI3 corresponds to TX_Setting_ID1+2, and thus a set of additional TX setting IDs can be derived.

TABLE 4

| RSSI Code | TX Setting ID |
|---|---|
| RSSI1 | TX_Setting_ID1 |
| RSSI2 | |
| RSSI3 | |
| RSSI4 | |
| RSSI5 | |
| RSSI6 | |
| RSSI7 | |
| RSSI8 | |
| RSSI9 | |
| RSSI10 | |
| RSSI11 | |
| RSSI12 | |
| RSSI13 | |
| RSSI14 | |
| RSSI15 | |
| RSSI16 | |
| RSSI17 | |
| RSSI18 | |
| RSSI19 | |
| RSSI20 | |
| RSSI21 | |
| RSSI22 | |
| RSSI23 | |
| RSSI24 | |

Table 5 provides an example of a universal APC table for the communications device 240 depicted in FIG. 2 containing RSSI code values and one TX setting ID value. In Table 5, RSSI code value 0 corresponds to TX setting ID value 5. Based on the relationship between the RSSI code value of 0 and the TX setting ID value of 5, it can be derived that an RSSI code value of 50 corresponds to a TX setting ID value of 6, an RSSI code value of 100 corresponds to a TX setting ID value of 7, and thus a set of additional TX setting ID values can be derived.

TABLE 5

| RSSI Code | TX Setting ID |
|---|---|
| 0 | 5 |
| 50 | |
| 100 | |
| 150 | |
| 200 | |
| 250 | |
| 300 | |
| 350 | |
| 400 | |
| 450 | |
| 500 | |
| 550 | |
| 600 | |
| 650 | |
| 700 | |
| 750 | |
| 800 | |
| 850 | |
| 900 | |
| 950 | |
| 1000 | |
| 1050 | |
| 1100 | |
| 1150 | |

In some embodiments, the LMAs of the communications device 240 are mapped to specific transmission configurations of the communications device. Table 6 provides an example of a table containing LMAs of the communications device and corresponding transmission configurations of the communications device. In Table 6, transmission configurations of the communications device includes LDO output voltage (i.e., transmitter driver supply voltage), back-off voltage (a ratio between a maximum possible transmit power and an actual mean transmit power of the communications device), modulation configuration of the TX driver 218, the number of transmitter drivers in the communications device and other transmitter settings. However, the table containing LMAs of the communications device and corresponding transmission configurations of the communications device is not limited to the example provided in Table 6.

Table 7 provides an example of a universal APC table containing RSSI codes, TX configuration IDs and corresponding specific transmission configurations of the communications device. In Table 7, TX configuration IDs 1-23 correspond to specific sets or combinations of transmission configurations of the communications device, respectively. Each set of transmission configurations of the communications device includes LDO output voltage (i.e., transmitter driver supply voltage), back-off voltage (a ratio between a maximum possible transmit power and an actual mean transmit power of the communications device), modulation configuration of the TX driver, the number of transmitter drivers in the communications device and other transmitter settings. In some embodiments, the RSSI codes are not included in the universal APC table.

TABLE 6

| Field strength (A/m) | Target ISO LMA (mVpp) | LDO TX voltage (V) | Back-off | Modulation index configuration | Number of TX drivers | Other TX Mod |
|---|---|---|---|---|---|---|
| H0 | LMA1 | TVDD1 | BACKOFF1 | MODINDEX1 | 2 | MOD1 |
| H1 | LMA2 | TVDD1 | BACKOFF1 | MODINDEX1 | 2 | MOD1 |
| H2 | LMA3 | TVDD1 | BACKOFF1 | MODINDEX1 | 2 | MOD1 |
| H3 | LMA4 | TVDD1 | BACKOFF1 | MODINDEX2 | 2 | MOD1 |
| H4 | LMA5 | TVDD2 | BACKOFF1 | MODINDEX2 | 2 | MOD2 |
| H5 | LMA6 | TVDD2 | BACKOFF1 | MODINDEX2 | 2 | MOD2 |
| H6 | LMA7 | TVDD2 | BACKOFF1 | MODINDEX2 | 2 | MOD2 |
| H7 | LMA8 | TVDD2 | BACKOFF1 | MODINDEX2 | 2 | MOD2 |
| H8 | LMA9 | TVDD2 | BACKOFF1 | MODINDEX2 | 2 | MOD2 |
| H9 | LMA10 | TVDD2 | BACKOFF1 | MODINDEX2 | 2 | MOD2 |
| H10 | LMA11 | TVDD2 | BACKOFF1 | MODINDEX2 | 2 | MOD2 |
| H11 | LMA12 | TVDD3 | BACKOFF1 | MODINDEX2 | 2 | MOD2 |
| H12 | LMA13 | TVDD3 | BACKOFF1 | MODINDEX2 | 2 | MOD2 |
| H13 | LMA14 | TVDD3 | BACKOFF1 | MODINDEX2 | 2 | MOD2 |
| H14 | LMA15 | TVDD3 | BACKOFF1 | MODINDEX2 | 2 | MOD2 |
| H15 | LMA16 | TVDD3 | BACKOFF1 | MODINDEX2 | 2 | MOD2 |
| H16 | LMA17 | TVDD3 | BACKOFF1 | MODINDEX2 | 2 | MOD2 |
| H17 | LMA18 | TVDD3 | BACKOFF1 | MODINDEX2 | 2 | MOD2 |
| H18 | LMA19 | TVDD4 | BACKOFF1 | MODINDEX2 | 2 | MOD2 |
| H19 | LMA20 | TVDD4 | BACKOFF1 | MODINDEX2 | 2 | MOD2 |
| H20 | LMA21 | TVDD4 | BACKOFF1 | MODINDEX2 | 2 | MOD2 |
| H21 | LMA22 | TVDD4 | BACKOFF1 | MODINDEX2 | 1 | MOD2 |
| H22 | LMA23 | TVDD4 | BACKOFF1 | MODINDEX2 | 1 | MOD2 |
| H23 | LMA24 | TVDD4 | BACKOFF1 | MODINDEX2 | 1 | MOD2 |

In some embodiments, a universal APC table for the communications device 240 depicted in FIG. 2 includes specific transmission configurations of the communications device. The transmission configurations can range from a maximum possible TX setting for the TX driver 218 (considering supply voltage, modulation scheme and chip capability) to the lowest possible TX setting for the TX driver.

TABLE 7

| RSSI Code | TX configuration ID | LDO TX voltage (V) | Back-off | Modulation index configuration | Number of TX drivers | Other TX Mod |
|---|---|---|---|---|---|---|
| RSSI1 | 0 | TVDD1 | BACKOFF1 | MODINDEX1 | 2 | MOD1 |
| RSSI2 | 1 | TVDD1 | BACKOFF1 | MODINDEX1 | 2 | MOD1 |
| RSSI3 | 2 | TVDD1 | BACKOFF1 | MODINDEX1 | 2 | MOD1 |
| RSSI4 | 3 | TVDD1 | BACKOFF1 | MODINDEX2 | 2 | MOD1 |
| RSSI5 | 4 | TVDD2 | BACKOFF1 | MODINDEX2 | 2 | MOD2 |
| RSSI6 | 5 | TVDD2 | BACKOFF1 | MODINDEX2 | 2 | MOD2 |
| RSSI7 | 6 | TVDD2 | BACKOFF1 | MODINDEX2 | 2 | MOD2 |
| RSSI8 | 7 | TVDD2 | BACKOFF1 | MODINDEX2 | 2 | MOD2 |
| RSSI9 | 8 | TVDD2 | BACKOFF1 | MODINDEX2 | 2 | MOD2 |
| RSSI10 | 9 | TVDD2 | BACKOFF1 | MODINDEX2 | 2 | MOD2 |
| RSSI11 | 10 | TVDD2 | BACKOFF1 | MODINDEX2 | 2 | MOD2 |
| RSSI12 | 11 | TVDD3 | BACKOFF1 | MODINDEX2 | 2 | MOD2 |
| RSSI13 | 12 | TVDD3 | BACKOFF1 | MODINDEX2 | 2 | MOD2 |
| RSSI14 | 13 | TVDD3 | BACKOFF1 | MODINDEX2 | 2 | MOD2 |
| RSSI15 | 14 | TVDD3 | BACKOFF1 | MODINDEX2 | 2 | MOD2 |
| RSSI16 | 15 | TVDD3 | BACKOFF1 | MODINDEX2 | 2 | MOD2 |
| RSSI17 | 16 | TVDD3 | BACKOFF1 | MODINDEX2 | 2 | MOD2 |
| RSSI18 | 17 | TVDD3 | BACKOFF1 | MODINDEX2 | 2 | MOD2 |
| RSSI19 | 18 | TVDD4 | BACKOFF1 | MODINDEX2 | 2 | MOD2 |
| RSSI20 | 19 | TVDD4 | BACKOFF1 | MODINDEX2 | 2 | MOD2 |

TABLE 7-continued

| RSSI Code | TX configuration ID | LDO TX voltage (V) | Back-off | Modulation index configuration | Number of TX drivers | Other TX Mod |
|---|---|---|---|---|---|---|
| RSSI21 | 20 | TVDD4 | BACKOFF1 | MODINDEX2 | 2 | MOD2 |
| RSSI22 | 21 | TVDD4 | BACKOFF1 | MODINDEX2 | 1 | MOD2 |
| RSSI23 | 22 | TVDD4 | BACKOFF1 | MODINDEX2 | 1 | MOD2 |
| RSSI24 | 23 | TVDD4 | BACKOFF1 | MODINDEX2 | 1 | MOD2 |

In the embodiment depicted in FIG. 2, the APC unit 200 adjusts the universal APC table in response to an RX-Gain parameter and/or a TX-Gain parameter. For example, the APC unit can scale, shift, or transform the universal APC table to a specific platform/setting with a scaling parameter for the RX-gain and a shift parameter for the TX-gain. In an embodiment, the RX-Gain parameter is a ratio between the RSSI value generated by the RSSI unit 216 and the field strength, H, of inductive coupling. The field strength, H, of inductive coupling may be measured by a sensor and reported to the APC unit. In an embodiment, the TX-Gain parameter is a ratio between a load modulation amplitude of the communications device and a transmitter output signal amplitude of the communications device. The load modulation amplitude of the communications device may be indirectly measured by measuring the signal amplitude of the received RF signal to generate a reader RSSI value. The transmitter output signal amplitude, which is the signal amplitude of the output RF signal (TX signal), may be measured by a sensor and reported to the APC unit.

In some embodiments, the APC unit 200 adjusts the universal APC table in response to the RX-Gain parameter by scaling up the RSSI parameter in the universal APC table in response to an increase in the ratio between the RSSI at the communications device and the field strength of inductive coupling and scaling down the RSSI parameter in the universal APC table in response to a decrease in the ratio between the RSSI at the communications device and the field strength of inductive coupling. For example, with a RX-Gain that is 10% lower than a reference RX-gain, a RSSI reading of 100 can be lowered by 10%, resulting in a scaled RSSI value of 90. With a RX-Gain that is 15% higher than a reference RX-gain, a RSSI reading of 100 can increase by 15%, resulting in a scaled RSSI value of 115. Table 8 provides an example of a lookup table containing RSSI codes corresponding to a reference RX-Gain.

TABLE 8

| Field strength (A/m) | Target ISO LMA (mVpp) | RSSI code |
|---|---|---|
| H0 | LMA1 | 0 |
| H1 | LMA2 | 100 |
| H2 | LMA3 | 200 |
| H3 | LMA4 | 300 |
| H4 | LMA5 | 400 |
| H5 | LMA6 | 500 |
| H6 | LMA7 | 600 |
| H7 | LMA8 | 700 |
| H8 | LMA9 | 800 |
| H9 | LMA10 | 900 |
| H10 | LMA11 | 1000 |
| H11 | LMA12 | 1100 |
| H12 | LMA13 | 1200 |
| H13 | LMA14 | 1300 |
| H14 | LMA15 | 1400 |
| H15 | LMA16 | 1500 |
| H16 | LMA17 | 1600 |
| H17 | LMA18 | 1700 |
| H18 | LMA19 | 1800 |
| H19 | LMA20 | 1900 |
| H20 | LMA21 | 2000 |
| H21 | LMA22 | 2100 |
| H22 | LMA23 | 2200 |
| H23 | LMA24 | 2300 |

Table 9 provides an example of a lookup table for the communications device 240 depicted in FIG. 2 containing RSSI codes corresponding to a RX-Gain that is 25% higher than the reference RX-Gain. In Table 9, with the RX-Gain that is 25% higher than the reference RX-gain, the RSSI codes are scaled up 25%. For example, a RSSI code of 125 can increase by 25%, resulting in a scaled RSSI value of 125. Using the scaled RSSI code, the APC unit 200 finds the corresponding transmission configuration for the communications device 240. If the platform gain (e.g., caused by the matching network 210 and the antenna 220) is too high, a scaling of the value from the RSSI unit 216 is used to scale the platform gain down to the nominal case (e.g., Table 8). After scaling, the original universal APC table can be re-used.

TABLE 9

| Field strength (A/m) | Target ISO LMA (mVpp) | RSSI code |
|---|---|---|
| H0 | LMA1 | 0 |
| H1 | LMA2 | 125 |
| H2 | LMA3 | 250 |
| H3 | LMA4 | 375 |
| H4 | LMA5 | 500 |
| H5 | LMA6 | 625 |
| H6 | LMA7 | 750 |
| H7 | LMA8 | 875 |
| H8 | LMA9 | 1000 |
| H9 | LMA10 | 1125 |
| H10 | LMA11 | 1250 |
| H11 | LMA12 | 1375 |
| H12 | LMA13 | 1500 |
| H13 | LMA14 | 1625 |
| H14 | LMA15 | 1750 |
| H15 | LMA16 | 1875 |
| H16 | LMA17 | 2000 |
| H17 | LMA18 | 2125 |
| H18 | LMA19 | 2250 |
| H19 | LMA20 | 2375 |
| H20 | LMA21 | 2500 |
| H21 | LMA22 | 2625 |
| H22 | LMA23 | 2750 |
| H23 | LMA24 | 2875 |

Table 10 provides an example of a lookup table for the communications device 240 depicted in FIG. 2 containing RSSI codes corresponding to a RX-Gain that is 25% lower than the reference RX-Gain. In Table 10, with the RX-Gain that is 25% lower than the reference RX-gain, the RSSI codes are scaled down 25%. For example, a RSSI code of 125 can decrease by 25%, resulting in a scaled RSSI value of 75. Using the scaled RSSI code, the APC unit 200 finds the corresponding transmission configuration for the communications device 240. If the platform gain (e.g., caused by the matching network 210 and the antenna 220) is too low, a scaling of the value from the RSSI unit 216 is used to scale the platform gain up to the nominal case (e.g., Table 8). After scaling, the original universal APC table can be re-used.

TABLE 10

| Field strength (A/m) | Target ISO LMA (mVpp) | RSSI code |
|---|---|---|
| H0 | LMA1 | 0 |
| H1 | LMA2 | 75 |
| H2 | LMA3 | 150 |
| H3 | LMA4 | 225 |
| H4 | LMA5 | 300 |
| H5 | LMA6 | 375 |
| H6 | LMA7 | 450 |
| H7 | LMA8 | 525 |
| H8 | LMA9 | 600 |
| H9 | LMA10 | 675 |
| H10 | LMA11 | 750 |
| H11 | LMA12 | 825 |
| H12 | LMA13 | 900 |
| H13 | LMA14 | 975 |
| H14 | LMA15 | 1050 |
| H15 | LMA16 | 1125 |
| H16 | LMA17 | 1200 |
| H17 | LMA18 | 1275 |
| H18 | LMA19 | 1350 |
| H19 | LMA20 | 1425 |
| H20 | LMA21 | 1500 |
| H21 | LMA22 | 1575 |
| H22 | LMA23 | 1650 |
| H23 | LMA24 | 1725 |

In some embodiments, the APC unit 200 shifts entries in the universal APC table in response to the change in the TX-gain parameter. The APC unit can shift entries in the universal APC table by a certain percentage, such as 10% or 20%, or by a predetermined step or steps. In some embodiments, the universal APC table is extended to include redundant data, which is used to apply the offset/shift due to the change in the TX-gain parameter. FIG. 3 illustrates an extended APC table for the communications device 240 depicted in FIG. 2 corresponding to a reference TX-Gain. In the APC table illustrated in FIG. 3, each of the sets of RSSI codes and TX setting IDs corresponds to specific transmission configurations of the communications device. For example, RSS1 and TX_Setting_ID1 correspond to a TX configuration ID of 8 while RSSI20 and TX_Setting_ID20 correspond to a TX configuration ID of 27.

FIG. 4 illustrates an extended APC table for the communications device 240 depicted in FIG. 2 corresponding to a TX-Gain that is higher than the reference TX-Gain. In the APC table illustrated in FIG. 4, the entries of RSSI codes and TX setting IDs are shifted to correspond to higher TX configuration IDs. For example, RSS1 and a TX_Setting_ID1 correspond to TX configuration ID of 11 while RSSI20 and TX_Setting_ID20 correspond to a TX configuration ID of 30.

FIG. 5 illustrates an extended APC table for the communications device 240 depicted in FIG. 2 corresponding to a TX-Gain that is lower than the reference TX-Gain. In the APC table illustrated in FIG. 5, the entries of RSSI codes and TX setting IDs are shifted to correspond to higher TX configuration IDs. For example, RSS1 and TX_Setting_ID1 correspond to TX configuration ID of 3 while RSSI20 and TX_Setting_ID20 correspond to TX configuration ID of 22.

Figure 6:
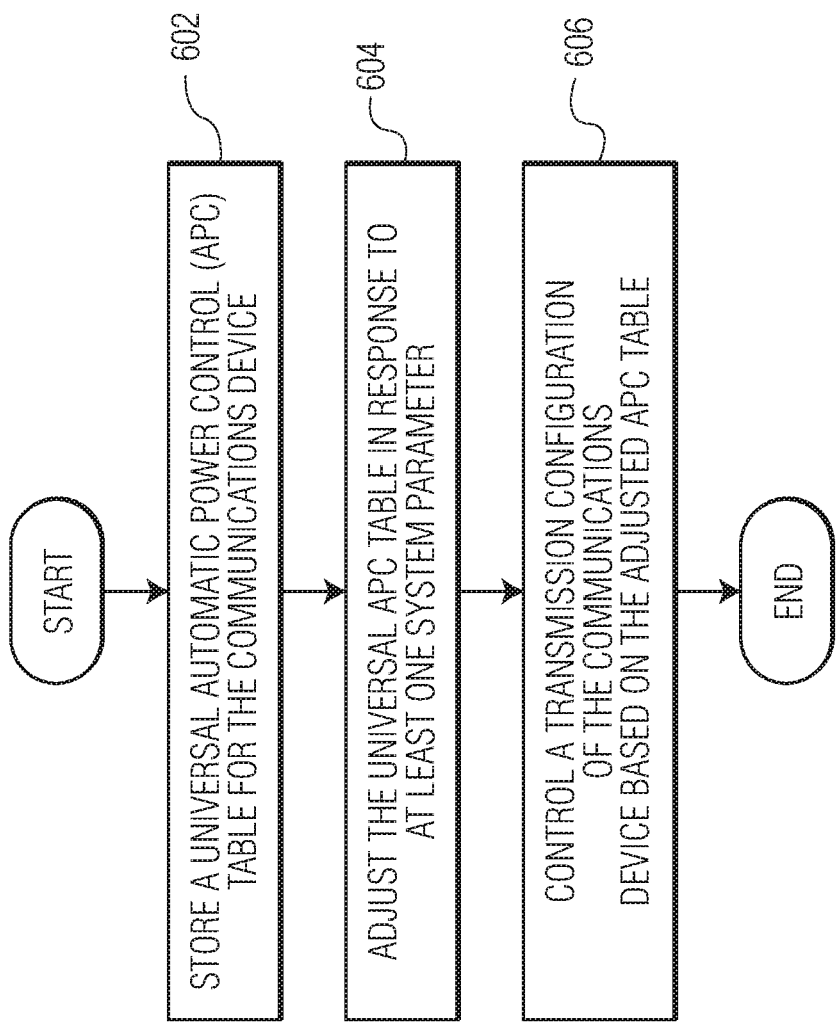
FIG. 6 is a process flow diagram of a method for APC in a communications device that communicates via inductive coupling in accordance with an embodiment of the invention.

FIG. 6 is a process flow diagram of a method for APC in a communications device that communicates via inductive coupling in accordance with an embodiment of the invention. At block 602, a universal APC table for the communications device is stored. At block 604, the universal APC table is adjusted in response to at least one system parameter. At block 606, a transmission configuration of the communications device is controlled based on the adjusted APC table. The communications device may be the same or similar to the communications device 140 depicted in FIG. 1 and/or the communications device 240 depicted in FIG. 2.

Figure 7:
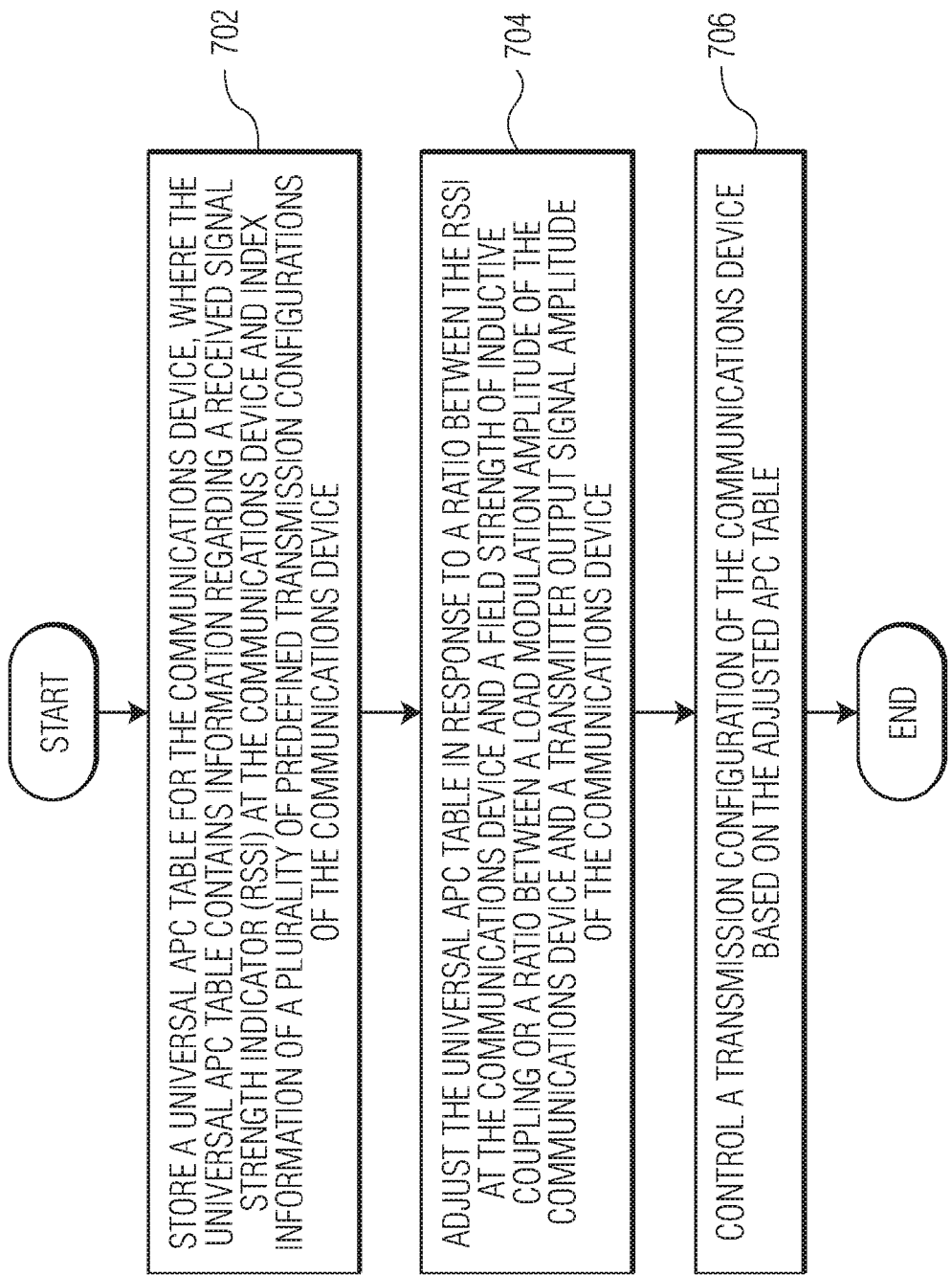
FIG. 7 is a process flow diagram of a method for APC in a communications device that communicates via inductive coupling in accordance with another embodiment of the invention.

FIG. 7 is a process flow diagram of a method for operating a communications device that communicates via inductive coupling in accordance with another embodiment of the invention. At block 702, a universal APC table for the communications device is stored, where the universal APC table contains information regarding a received signal strength indicator (RSSI) at the communications device and index information of a plurality of predefined transmission configurations of the communications device. At block 704, the universal APC table is adjusted in response to a ratio between the RSSI at the communications device and a field strength of inductive coupling or a ratio between a load modulation amplitude of the communications device and a transmitter output signal amplitude of the communications device. At block 706, a transmission configuration of the communications device is controlled based on the adjusted APC table. The communications device may be the same or similar to the communications device 140 depicted in FIG. 1 and/or the communications device 240 depicted in FIG. 2.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for automatic power control (APC) in a communications device that communicates via inductive coupling, the method comprising: storing a universal APC table for the communications device; adjusting the universal APC table in response to at least one system parameter; and controlling a transmission configuration of the communications device based on the adjusted APC table, wherein the universal APC table contains information regarding a received signal strength indicator (RSSI) at the communications device and information regarding corresponding transmission configuration of the communications device.

2. The method of claim 1, wherein the universal APC table contains information reflecting a relationship between a field strength of inductive coupling and a load modulation amplitude of the communications device.

3. The method of claim 1, wherein the information regarding the transmission configuration of the communications device comprises index information of a plurality of predefined transmission configurations of the communications device.

4. The method of claim 1, wherein the transmission configuration of the communications device comprises at least one of:
information regarding a transmitter driver supply voltage of the communications device;
information regarding modulation configuration of the communications device;
information regarding a number of transmitter drivers in the communications device; and
information regarding a ratio between a maximum possible transmit power and an actual mean transmit power of the communications device.

5. The method of claim 1, wherein adjusting the universal APC table in response to the at least one system parameter comprises scaling a parameter in the universal APC table in response to the at least one system parameter.

6. The method of claim 1, wherein adjusting the universal APC table in response to the at least one system parameter comprises shifting a plurality of entries in the universal APC table in response to the at least one system parameter.

7. The method of claim 1, wherein the at least one system parameter is selected from the group consisting of: a ratio between the RSSI at the communications device and a field strength of inductive coupling; and a ratio between a load modulation amplitude of the communications device and a transmitter output signal amplitude of the communications device.

8. The method of claim 7, wherein adjusting the universal APC table in response to the at least one system parameter comprises scaling a RSSI parameter in the universal APC table in response to the ratio between the RSSI at the communications device and the field strength of inductive coupling.

9. The method of claim 8, wherein adjusting the universal APC table in response to the at least one system parameter comprises scaling up the RSSI parameter in the universal APC table in response to an increase in the ratio between the RSSI at the communications device and the field strength of inductive coupling.

10. The method of claim 8, wherein adjusting the universal APC table in response to the at least one system parameter comprises scaling down the RSSI parameter in the universal APC table in response to a decrease in the ratio between the RSSI at the communications device and the field strength of inductive coupling.

11. The method of claim 7, wherein adjusting the universal APC table in response to the at least one system parameter comprises shifting a plurality of entries in the universal APC table in response to the ratio between the load modulation amplitude of the communications device and the transmitter output signal amplitude of the communications device.

12. An automatic power control (APC) unit for a communications device that communicates via inductive coupling, the APC unit comprising: an APC table storage unit that stores a universal APC table for the communications device; an APC adjustor unit configured to adjust the universal APC table in response to at least one system parameter; and a transmission configuration control unit configured to control a transmission configuration of the communications device based on the adjusted APC table, wherein the universal APC table contains information regarding a received signal strength indicator (RSSI) at the communications device and information regarding corresponding transmission configuration of the communications device.

13. The APC unit of claim 12, wherein the universal APC table contains information reflecting a relationship between a field strength of inductive coupling and a load modulation amplitude of the communications device.

14. The APC unit of claim 12, wherein the transmission configuration of the communications device comprises at least one of:
information regarding a transmitter driver supply voltage of the communications device;
information regarding modulation configuration of the communications device;
information regarding a number of transmitter drivers in the communications device; and
information regarding a ratio between a maximum possible transmit power and an actual mean transmit power of the communications device.

15. The APC unit of claim 12, wherein the at least one system parameter is selected from the group consisting of: a ratio between the RSSI at the communications device and a field strength of inductive coupling; and a ratio between a load modulation amplitude of the communications device and a transmitter output signal amplitude of the communications device.

16. The APC unit of claim 15, wherein the APC adjustor unit is configured to: scale up a RSSI parameter in the universal APC table in response to an increase in the ratio between the RSSI at the communications device and the field strength of inductive coupling; and scale down the RSSI parameter in the universal APC table in response to a decrease in the ratio between the RSSI at the communications device and the field strength of inductive coupling.

17. The APC unit of claim 15, wherein the APC adjustor unit is configured to shift a plurality of entries in the universal APC table in response to the ratio between the load modulation amplitude of the communications device and the transmitter output signal amplitude of the communications device.

18. A method for automatic power control (APC) in a communications device that communicates via inductive coupling, the method comprising:

storing a universal APC table for the communications device, wherein the universal APC table contains information regarding a received signal strength indicator (RSSI) at the communications device and index information of a plurality of predefined transmission configurations of the communications device;

adjusting the universal APC table in response to a ratio between the RSSI at the communications device and a field strength of inductive coupling or a ratio between a load modulation amplitude of the communications device and a transmitter output signal amplitude of the communications device; and controlling a transmission configuration of the communications device based on the adjusted APC table.

19. A method for automatic power control (APC) in a communications device that communicates via inductive coupling, the method comprising: storing a universal APC table for the communications device; adjusting the universal APC table in response to at least one system parameter, wherein the at least one system parameter is selected from the group consisting of: a ratio between a received signal strength indicator (RSSI) at the communications device and a field strength of inductive coupling; and a ratio between a load modulation amplitude of the communications device and a transmitter output signal amplitude of the communications device; and controlling a transmission configuration of the communications device based on the adjusted APC table.

* * * * *